United States Patent Office 3,330,848
Patented July 11, 1967

3,330,848
ISOCYANATO-SUBSTITUTED SULFONYL
ISOCYANATES
Henri Ulrich, Northford, Conn., assignor to The Upjohn
Company, Kalamazoo, Mich., a corporation of Delaware
No Drawing. Filed May 5, 1964, Ser. No. 365,151
3 Claims. (Cl. 260—453)

ABSTRACT OF THE DISCLOSURE

This invention is a genus of novel isocyanato-substituted sulfonyl isocyanates of the formula:

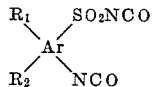

wherein Ar is an aromatic nucleus corresponding to a hydrocarbon selected from the group consisting of benzene, naphthalene, diphenyl, and diphenylmethane, and wherein $R_1$ and $R_2$ are selected from the group consisting of hydrogen, lower alkyl, lower alkoxy, and halogen, with the proviso that the —NCO and —$SO_2NCO$ moieties not be in ortho relationship on said aromatic nucleus. Organic isocyanates are stabilized by small quantities of these novel compounds.

---

This invention relates to novel compositions of matter and to methods for producing them. In particular, this invention relates to novel isocyanato-substituted sulfonyl isocyanates of the formula:

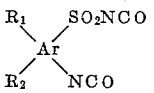
I wherein Ar is an aromatic nucleus corresponding to a hydrocarbon selected from the group consisting of benzene, naphthalene, diphenyl, and diphenylmethane, and wherein $R_1$ and $R_2$ are selected from the group consisting of hydrogen, lower alkyl, lower alkoxy, and halogen, with the proviso that the —NCO and —$SO_2NCO$ moieties not be in ortho relationship on said aromatic nucleus. The phrase, aromatic nucleus corresponding to a hydrocarbon, is defined as the moiety which remains when hydrogen atoms of one of the listed hydrocarbons have been replaced by an —$SO_2NCO$ moiety, an —NCO moiety, and by the appropriate number of alkyl, alkoxy, and/or halogen moieties. For example, when Ar corresponds to benzene and when $R_1$ and $R_2$ are hydrogen, Ar is phenylene. Further, when Ar corresponds to naphthalene and when $R_1$ is methyl and $R_2$ is hydrogen, Ar is methylnaphthylene.

When Ar corresponds to benzene, the —NCO and —$SO_2NCO$ moieties can be in meta or para relationship to each other. When Ar corresponds to naphthalene, diphenyl, or diphenylmethane, the —NCO and —$SO_2NCO$ moieties can be attached to the same ring in meta or para relationship to each other or to different rings in any of the possible position combinations. $R_1$ and $R_2$ can be the same or different, and can be attached to the same ring or to different rings in any of the possible position combinations relative to each other and to the —$SO_2NCO$ and —NCO moieties.

Examples of lower alkyl are methyl, ethyl, propyl, butyl, pentyl, hexyl, heptyl, octyl, and isomeric forms thereof. Examples of lower alkoxy are methoxy, ethoxy, propoxy, butoxy, pentyloxy, hexyloxy, heptyloxy, octyloxy, and isomeric forms thereof. Examples of halogen are fluorine, chlorine, bromine, and iodine.

Useful compositions of matter can be produced by incorporating relatively small amounts of one or more of the novel isocyanato-substituted sulfonyl isocyanates of this invention into organic isocyanates.

Organic isocyanates including both monoisocyanates and polyisocyanates are generally colorless liquids or solids which tend to decompose on storage even in the absence of air and moisture. In some instances, this decomposition results in discoloration of the organic isocyanate, i.e., a change to a light yellow to brown or even, in extreme cases, to dark brown. In other instances, the decomposition results in the formation of products with relatively high melting points and low solubility in the organic isocyanate. If the organic isocyanate is a liquid at the storage temperature, these decomposition products will accumulate in the form of a precipitate. If the organic isocyanate is a solid at the storage temperature, the solid decomposition products are still likely to form but, of course, will not be revealed as a precipitate until the organic isocyanate is melted as it often is prior to transfer from the storage container. In some instances, both discoloration and precipitate formation are observed. In other instances, only one or the other of these decomposition phenomena is observed.

The discoloration of organic isocyanates represents a serious problem where colorless or light colored reaction products are to be produced. Precipitate formation in organic isocyanates also represents a serious problem when the isocyanates are to be metered through small-bore pipes and valves, or where solid impurities are undesirable in a reaction product, for example, an elastomeric fiber or film. Although discolorations can be removed by distillation and undesired solids can be removed by filtration or distillation, the thus treated organic isocyanates often discolor again and/or deposit precipitates within a few days or, in some instances, even in a few hours. It is not economical and is usually impractical to distill or filter an organic isocyanate immediately before use. Hence, any method of preventing or retarding discoloration and/or precipitate formation in organic isocyanates would be of great value to the users of these useful substances.

The exact causes of color formation and precipitate formation in organic isocyanates are not known. Although it has been observed that light, oxygen, and moisture tend to accelerate these phenomena, an organic isocyanate will often darken and/or deposit precipitate even when kept in the dark in a sealed container with oxygen and moisture excluded. It is thought that the precipitates which form in organic isocyanates are, at least in part, polymerized isocyanates.

It has now been discovered that organic isocyanates can be stabilized against discoloration by having incorporated therewith a stabilizing amount of one or more of the novel isocyanato-substituted sulfonyl isocyanates of this invention. It has also been discovered that organic isocyanates can be stabilized against precipitate formation by having incorporated therewith a stabilizing amount of one or more of the novel isocyanato-substituted sulfonyl isocyanates of this invention.

The stabilization power of the novel isocyanato-substituted sulfonyl isocyanates varies slightly. Therefore, the necessary amount of an isocyanato-substituted sulfonyl isocyanate will depend upon that variance as well as such factors as the tendency of the organic isocyanate to discolor and/or deposit precipitate, and the storage and use conditions to which the organic isocyanate is to be subjected. For example, if light can be excluded during storage, less of the isocyanato-substituted sulfonyl isocyanate will usually be needed. As will be apparent to those skilled in the art, the optimum amount of the isocyanato-substituted sulfonyl isocyanate for a particular organic isocyanate stabilization problem can readily be determined by small scale experiments which simulate the expected large scale storage conditions. Ordinarily, the necessary amount of isocyanato-substituted sulfonyl isocyanate will be in the range about 0.1% to about 5% by weight, based on the organic isocyanate. Other inert substances can, of course, be present in the stabilized organic isocyanate composition. For example, a volatile inert solvent can be present when the organic isocyanate is to be used as an adhesive.

The novel isocyanato-substituted sulfonyl isocyanates of this invention are especially useful as stabilizers of organic polyisocyanates when the latter are eventually to be used to form polyurethanes and polyureas by interaction with polyols and polyamines, respectively. The —$SO_2NCO$ moiety of the isocyanato-substituted sulfonyl isocyanates usually reacts at least as readily with the hydroxyl moieties of polyols and with the amino moieties of polyamines as do the —NCO moieties of the polyisocyanates, forming sulfonylurethane and sulfonylurea chain units. Thus the isocyanato-substituted sulfonyl isocyanate will serve to stabilize the polyisocyanate up to the time of transformation of the later to a more stable product, i.e., polyurethane or polyurea. At that time, the isocyanato-substituted sulfonyl isocyanate will be permanently incorporated into the polyurethane or polyurea structure. Unlike other known stabilizers of polyisocyanates, the isocyanato-substituted sulfonyl isocyanate stabilizers will not be present as such in the polymers to interfere with further transformation and use of the latter. When stabilizing a diisocyanate which is subsequently to be transformed to a polyurethane or polyurea, it is often advantageous to use an isocyanato-substituted sulfonyl isocyanate which is of comparable structure so that the final polymer chains will have the maximum structural continuity. For example, it is often advantageous to use 3-isocyanato-p-tolylsulfonyl isocyanate or 5-isocyanato-o-tolylsulfonyl isocyanate to stabilize 4-methyl-m-phenylene diisocyanate (TDI) or to use α-(p-isocyanatophenyl)-p-tolylsulfonyl isocyanate to stabilize methylenediphenylene diisocyanate (MDI).

The novel isocyanato-substituted sulfonyl isocyanates of this invention are also useful as substitutes for part or all of the diisocyanate reactant in the production of polyurethanes by interaction of diisocyanates and polyols or in the production of polyureas by interaction of diisocyanates and polyamines. Methods of producing polyurethanes and polyureas, for example, in the forms of films, fibers, and foams, from isocyanato-substituted sulfonyl isocyanates or from mixtures of those with diisocyanates will be readily apparent to those skilled in the art. The resulting polyurethanes and polyureas have superior properties especially with regard to resistance to discoloration on exposure to light. Since the sulfonyl isocyanate moiety is frequently substantially more reactive than the isocyanato moiety toward active hydrogen compounds, the novel compounds of this invention are useful in preparing prepolymers containing, for example, sulfonylurethane or sulfonylurea linkages. The unreacted isocyanato moieties in such prepolymers can subsequently be reacted with the same or a different active hydrogen compound, for example, a polyol or polyamine, to produce useful polyurethanes, polyureas, or mixed polyurethane-polyureas. See, for example, U.S. Patent 2,729,666.

The novel isocyanato-substituted sulfonyl isocyanates of this invention are produced by mixing phosgene with an amino-substituted sulfonylurea of the formula:

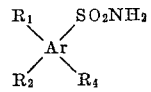    II wherein Ar, $R_1$, and $R_2$ are as defined above and wherein $R_3$ is an organic moiety attached to the remainder of the sulfonylurea molecule by a bond to a carbon atom of $R_3$. The products of this novel reaction are the isocyanato-substituted sulfonyl isocyanate of Formula I and an isocyanate of formula $R_3NCO$. In this novel reaction, —$NH_2$ is transformed to —NCO, and

—$SO_2NHCONHR_3$ is transformed to —$SO_2NCO$. This novel method is usually not useful for the production of isocyanato-subtsituted sulfonyl isocyanates of Formula I wherein the —NCO and —$SO_2NCO$ moieties are on adjacent carbon atoms of Ar, i.e., in ortho relationship to each other. Interaction of phosgene with a Formula II sulfonyl urea wherein the —$NH_2$ and —$SO_2NHCONHR_3$ moities are in ortho relationship usually results in a ring closure and production of a compound of the formula:

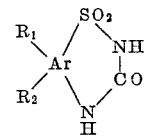    III rather than the desired isocyanato-substituted sulfonyl isocyanate.

Sulfonyl ureas of Formula II are known in the art or can be prepared by methods known in the art, e.g., U.S. Patent 2,907,692; British Patents 789,788; 792,776; 831,043; 831,044; 835,390; 872,567; 874,070; Swiss Patents 331,059 and 341,821; J. Indian Chem. Soc. 38, 417–8 (1961); Arzneimittelforschung 8, 444–8 (1958). It is especially advantageous to prepare Formula II sulfonylureas by interaction of an isocyanate of formula $R_3NCO$ and a sulfonamide of the formula:

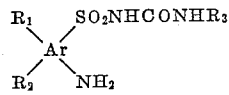    IV wherein $R_1$ and $R_2$ are as defined above and wherein $R_4$ is a nitro moiety or an acylamino moiety, followed by hydrogenation of the nitro or hydrolysis of the acylamino. When using one of those two methods, it is preferred that $R_3$ be lower alkyl. Then the isocyanate by-product of the interaction of phosgene and the Formula II compound will usually be a liquid of relatively low boiling point and hence easily recoverable from the reaction mixture for use in producing additional Formula II reactant by interaction with the Formula IV sulfonamide. Although there is usually no reason for $R_3$ to be other than lower alkyl, $R_3$ can be any organic moiety as long as it is attached to the remainder of the Formula II molecule by a bond to a carbon atom of $R_3$.

At least two moles of phosgene should be reacted with each mole of the Formula II sulfonylurea. It is preferred to use a slight to moderate excess of phosgene, i.e., about 1% to about 25% by weight beyond the theoretical amount, to ensure that each sulfonylurea moiety and each amino moiety is contacted by a full molecular equivalent of phosgene.

This novel reaction is carried out by mixing the Formula II reactant with the necessary amount of phosgene in the range about 0° to about 175° C. It is often advantageous to mix equivalent amounts of phosgene and Formula II reactant in the range about 0° to about 35° C., and then to heat the resulting mixture in the range about 100° to about 175° C. while adding small additional amounts of phosgene to replace that which escapes from the reaction vessel. A useful alternative procedure involves gradual mixing of the phosgene and sulfonylurea in the range about 75° to about 100° C., followed by a relatively short heating period in the range about 125° to about 175° C. It is also advantageous to use a liquid diluent which does not itself react appreciably with phosgene. Suitable diluents are the normally liquid aromatic hydrocarbons and halogenated hyarocarbons, e.g., benzene, toluene, the xylenes, ethylbenzene, cymene, cumene, mesitylene, chlorobenzene, dichlorobenzene, and the like. The amount of diluent is not critical, sufficient being used to give a solution or mobile slurry at the reaction temperature. It is usually advantageous to choose a diluent which will boil at the maximum desired reaction temperature.

The time required for this novel reaction will depend upon such factors as the nature of the sulfonylurea reactant, the nature and amount of diluent, and the reaction temperature. With a reaction temperature in the range about 75° to about 140° C., a reaction time about 15 to about 300 minutes is usually sufficient.

The desired isocyanato-substituted sulfonyl isocyanate can usually be isolated by purging any excess phosgene from the reaction mixture with a stream of an inert gas, e.g., nitrogen or argon, followed by fractional distillation to separate diluent, isocyanate, and isocyanato-substituted sulfonyl isocyanate. The latter can then be purified by conventional techniques, e.g., fractional distillation or recrystallization. If desired, the isocyanate by-product, i.e., $R_3NCO$, can also be isolated and purified by conventional techniques, and then used to prepare additional sulfonylurea starting material.

The invention can be more fully understood from the following examples.

*Example 1.—m-Isocyanatophenylsulfonyl isocyanate*

1-butyl-3-metanilylurea (40 g.; 0.15 mole) was added gradually during 7 minutes to a stirred solution of phosgene (30 g.; 0.3 mole) in 400 ml. of chlorobenzene with cooling to maintain the mixture in the range about 0° to 5° C. After stirring for an additional 10 minutes without cooling, a slow stream of phosgene was passed into the reaction mixture while the latter was heated to boiling and boiled under reflux for 60 minutes. Excess phosgene was then removed by purging the hot mixture with nitrogen, and the reaction mixture was filtered. Chlorobenzene and butyl isocyanate were removed from the filtrate by distillation, and the resulting residue was distilled at reduced pressure to give 15.3 g. of m-isocyanato-phenylsulfonyl isocyanate; B.P. 135–136° C. at 1.1 mm.

*Example 2.—p-Isocyanatophenylsulfonyl isocyanate*

1-butyl-3-sulfanilylurea (27.1 g.; 0.1 mole) was added gradually during 6 minutes to a stirred solution of phosgene (19.8 g.; 0.2 mole) in 270 ml. of chlorobenzene with cooling to maintain the mixture in the range about 0° to 5° C. After stirring for an additional 10 minutes without cooling, a slow stream of phosgene was passed into the reaction mixture while the latter was heated to boiling and boiled under reflux for 90 minutes. Excess phosgene was then removed by purging with nitrogen, and the reaction mixture was filtered. Chlorobenzene and butyl isocyanate were removed from the filtrate by distillation, and the resulting residue was distilled at reduced pressure to give 14.4 g. of p-isocyanatophenylsulfonyl isocyanate; B.P. 115–120° C. at 0.4 mm.; M.P. 40–44° C.

*Analysis.*—Calcd. for $C_8H_4N_2O_4S$: C, 42.85; H, 1.79; N, 12.29; S, 14.30. Found: C, 43.09; H, 2.17; N, 12.53; S, 14.28.

Following the procedure of Example 1 but using in place of 1-butyl-3-metanilylurea as a reactant, 1-butyl-3-(4-methylmetanilyl)urea;
1-butyl-3-(6-methylmetanilyl)urea;
1-butyl-3-(2-ethylsulmanilyl)urea;
1-butyl-3-(4-methoxymethanilyl)urea;
1-butyl-3-(3-chlorosulfanilyl)urea;
1-butyl-3-(5-amino-1-naphthylsulfonyl)urea;
1-butyl-3-(4-amino-5,8-dimethyl-1-naphthylsulfonyl)urea;
1-butyl-3-(4′-amino-4-biphenylylsulfonyl)urea;
1-butyl-3-(4′-amino-2,2′-dichloro-4-biphenylylsulfonyl)urea;
1-butyl-3-(4′-amino-3,3′-dimethoxy-4-biphenylylsulfonyl)urea;
1-butyl-3-[α-(p-aminophenyl)-p-tolylsulfonyl]urea;
1-butyl-3-[α-(4-amino-3-methoxyphenyl)-2-methoxy-p-tolylsulfonyl]urea;
and 1 - butyl-3-[α⁴-(4-amino-m-tolyl)-2,4-xylylsulfonyl]urea, there are obtained 3-isocyanato-p-tolylsulfonyl isocyanate;
5-isocyanato-o-tolylsulfonyl isocyanate;
4-isocyanato-2-ethyl-phenylsulfonyl isocyanate;
3-isocyanato-4-methoxyphenylsulfonyl isocyanate;
4-isocyanato-3-chlorophenylsulfonyl isocyanate;
5-isocyanato-1-naphthylsulfonyl isocyanate;
4-isocyanato-5,8-dimethyl-1-naphthylsulfonyl isocyanate;
4′-isocyanato-4-biphenylylsulfonyl isocyanate;
4′-isocyanato-2,2′-dichloro-4-biphenylylsulfonyl isocyanate;
4′-isocyanato-3,3′-dimethoxy-4-biphenylylsulfonyl isocyanate;
α-(p-isocyanatophenyl)-p-tolylsulfonyl isocyanate;
α-(4-isocyanato-3-methoxyphenyl)-2-methoxy-p-tolylsulfonyl isocyanate;

and α⁴-(4-isocyanato-m-tolyl)-2,4-xylylsulfonyl isocyanate, respectively. In each of the above examples, butyl isocyanate is also obtained.

Following the procedure of Example 1 but using in place of 1-butyl-3-metanilylurea as a reactant, 1-phenyl-3-metanilylurea, there is obtained phenyl isocyanate rather than butyl isocyanate in addition to the desired m-isocyanatophenylsulfonyl isocyanate.

*Example 3*

Two 2-gram samples of freshly-distilled, water-white methylenedi-p-phenylene diisocyanate of the usual commercial grade were heated just above the melting point to form clear melts. One percent by weight of p-isocyanatophenylsulfonyl isocyanate was then added to one of the melts. Cooling to 25° C. caused both samples to resolidify. The samples were then kept in the solid state in separate, sealed, glass containers at about 25° C. with the exclusion of light. After 5 days, the stabilized sample was still water-white, while the unstabilized sample had a yellow color. After about 7 days, each sample was dissolved in about 15 ml. of benzene and the solutions were filtered. No precipitate was visible or filterable in the solution of the stabilized sample. A significant amount of precipitate was obtained by filtering the solution of the unstabilized sample.

*Example 4*

Two 2-gram samples of freshly-distilled, water-white methylenedi-p-phenylene diisocyanate of the usual commercial grade were kept in separate, sealed, glass containers in the liquid state at about 50° C. with exclusion of light. One of the samples contained 1% by weight of p-isocyanatophenylsulfonyl isocyanate. After about 7 days, the stabilized sample was still water-white, while the unstabilized sample had a yellow color. The unstabilized sample was dissolved in about 15 ml. of benzene, and the solution was filtered to give a significant amount of precipitate and a yellow filtrate. The stabilized sample was kept further at 50° C., and was still water-white at the end of 4 weeks at 50° C.

*Example 5*

A mixture of a polymeric ε-caprolactone prepared according to U.S. Patent 2,914,556 (molecular weight 1050; 23.4 g.; 0.0223 mole) and 1,4-butanediol (2.04 g.; 0.0227 mole) was heated at about 90° to 100° C. at 5 mm. pressure for 30 minutes. The resulting mixture was then cooled to 50° C., and a mixture of m-isocyanatosulfonyl isocyanate (5.00 g.; 0.0223 mole) and methylenedi-p-phenylene diisocyanate (5.57 g.; 0.0223 mole) was added. The total mixture was stirred vigorously for one minute during which time the temperature of the mixture rose rapidly and the viscosity increased. The resulting mixture was then poured into a metal pan and cured for 2 hours at 110° C. in a nitrogen-purged oven to give a soft rubbery polymer which was useful as an adhesive.

*Example 6*

The procedure of Example 5 was repeated, using p-isocyanatophenylsulfonyl isocyanate in place of m-isocyanatophenylsulfonyl isocyanate. A similar soft rubbery polymer useful as an adhesive was obtained.

I claim:
1. An isocyanato-substituted sulfonyl isocyanate of the formula:

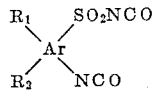

wherein Ar is an aromatic nucleus corresponding to a hydrocarbon selected from the group consisting of benzene, naphthalene, diphenyl, and diphenylmethane, and wherein $R_1$ and $R_2$ are selected from the group consisting of hydrogen, lower alkyl, lower alkoxy, and halogen, with the proviso that the —NCO and the —SO$_2$NCO moieties not be in ortho relationship on said aromatic nucleus.

2. m-Isocyanatophenylsulfonyl isocyanate.
3. p-Isocyanatophenylsulfonyl isocyanate.

References Cited

Degering: "An Outline of Organic Nitrogen Compounds," pp. 543–4, University Lithoprinters, Ypsilanti, Mich., 1945.

CHARLES B. PARKER, *Primary Examiner.*

D. H. TORRENCE, *Assistant Examiner.*

Notice of Adverse Decision in Interference

In Interference No. 96,178 involving Patent No. 3,330,848, H. Ulrich, ISO-CYANATO-SUBSTITUTED SULFONYL ISOCYANATES, final judgment adverse to the patentee was rendered July 31, 1968, as to claims 2 and 3.
[*Official Gazette September 24, 1968.*]

Disclaimer 3,330,848.—*Henri Ulrich*, Northford, Conn. ISOCYANATO-SUBSTITUTED SULFONYL ISOCYANATES. Patent dated July 11, 1967. Disclaimer filed Sept. 10, 1968, by the inventor; the assignee, *The Upjohn Company*, assenting.

Hereby enters this disclaimer to claims 2 and 3 of said patent.

[*Official Gazette January 28, 1969.*]